A. W. WALL.
VEHICLE FRAME.
APPLICATION FILED AUG. 7, 1909.
1,056,073.
Patented Mar. 18, 1913.
3 SHEETS—SHEET 1.
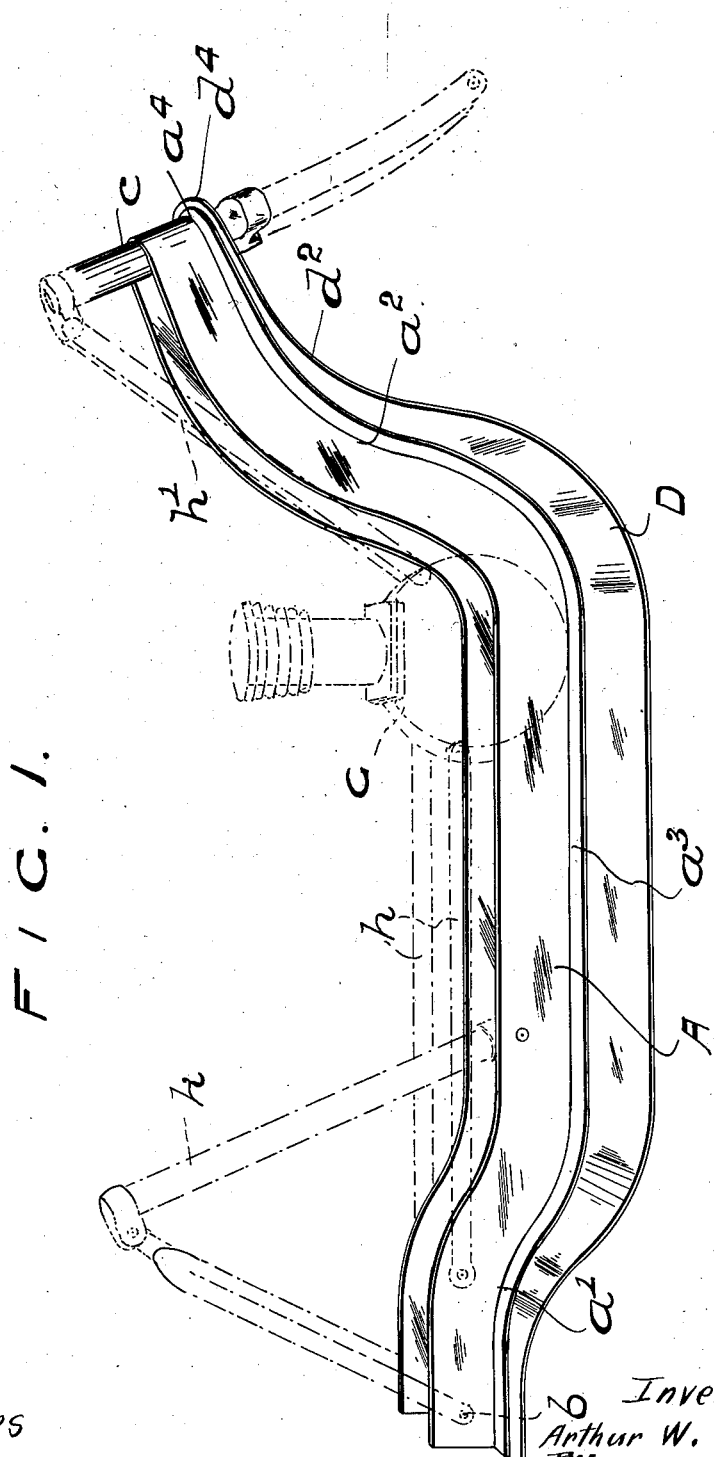
Witnesses
Inventor
Arthur W. Wall

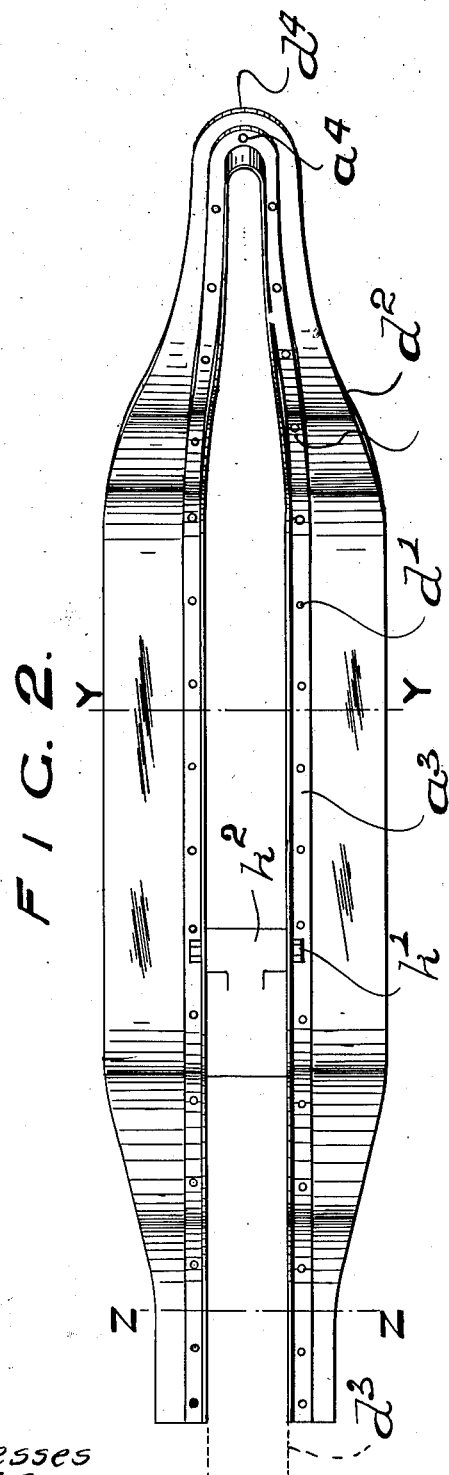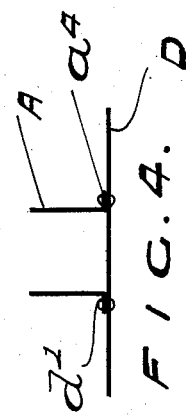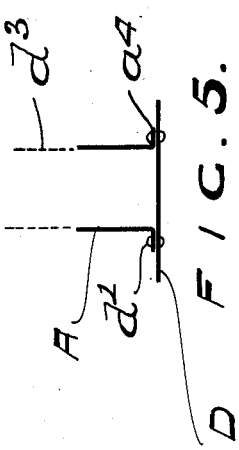

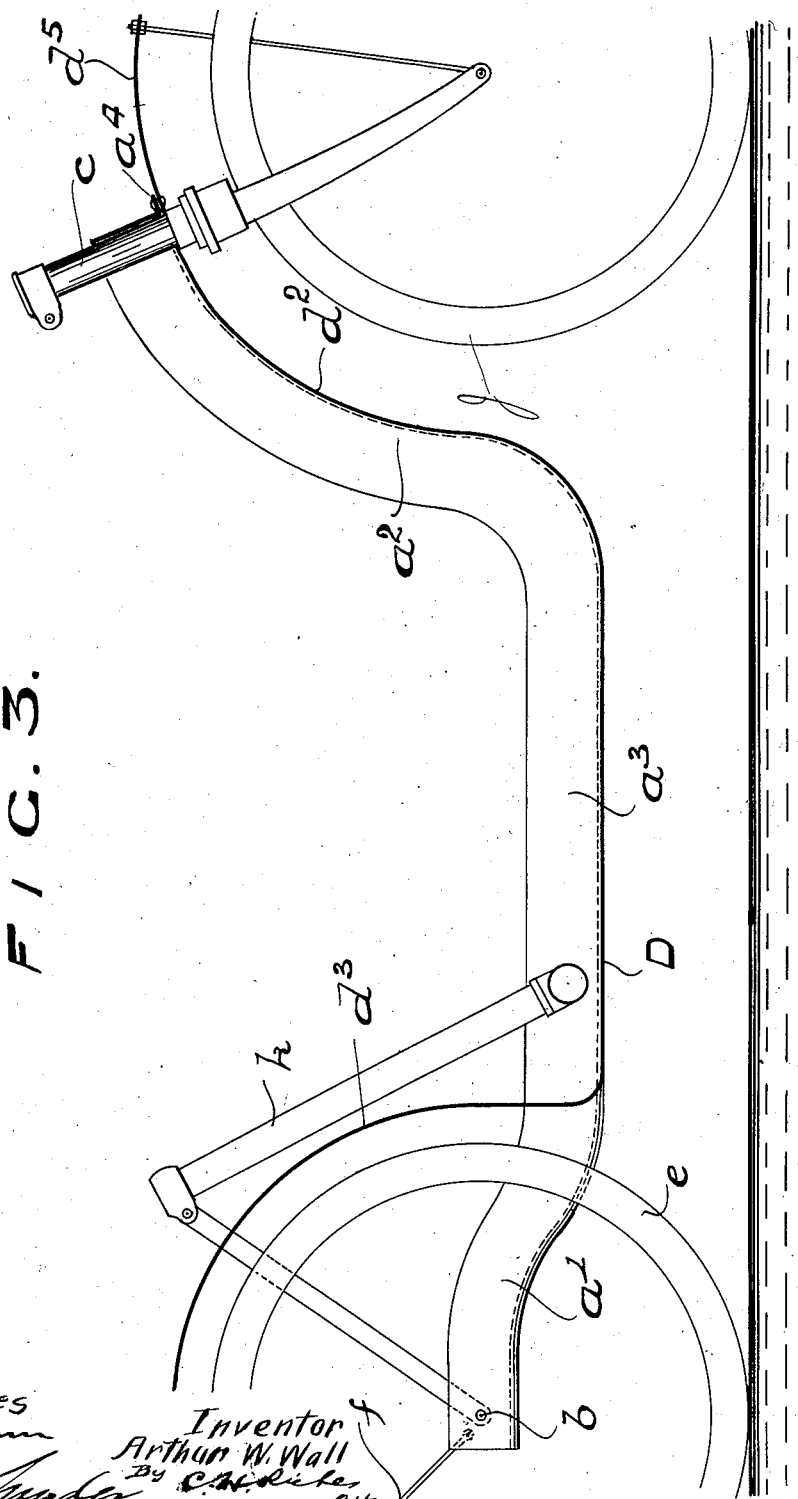

UNITED STATES PATENT OFFICE.

ARTHUR W. WALL, OF BIRMINGHAM, ENGLAND.

VEHICLE-FRAME.

1,056,073.  Specification of Letters Patent.  Patented Mar. 18, 1913.

Application filed August 7, 1909. Serial No. 511,737.

*To all whom it may concern:*

Be it known that I, ARTHUR WILLIAM WALL, subject of the Kingdom of Great Britain, residing at Roc Motor Works, Aston Road, Birmingham, in the county of Warwick, England, have invented a certain new and useful Vehicle-Frame, of which the following is a specification.

This invention comprises an improved motor cycle frame and it consists in a frame which has for its basis a flat platform extending from the back axle to the steering head in a single piece which platform constitutes footboards for the rider and also a shield to protect him from mud and dust.

Reference may be had to the appended explanatory drawings on which—

Figure 1 is a general view showing a motor cycle frame constructed in accordance with the present invention. Fig. 2 is a plan of the frame shown in Fig. 1. Fig. 3 is a modification showing the base plate of the frame extended to constitute a rear mudguard. Fig. 4 is a section on line Y Y of Fig. 2. Fig. 5 is a section on line Z Z of Fig. 2.

In the drawings, the frame is supplemented or stiffened by channel, angular or other suitable section, preferably as shown, the side members A of angle or L section extending from the rear spindle $b$ to the crown tube $c$ and back to such spindle in one single piece. The crown tube or head $c$ is riveted, bolted, welded or otherwise secured and the angle iron bent by any suitable means.

Connecting the side frames A is a base plate D, rivets $d'$ bolts or the like being used as the fastening means and being passed through a flange $a^4$ on the side members A. The base plate D is preferably adapted to present a strengthening flange $d^4$ which together with the flange $a^4$ encircles the crown tube.

In connection with pedalless machines, foot boards have been employed for the support of the rider's feet but are liable to be broken in case the machine falls whereas by this invention the base plates D form a very efficient support and at the same time are free from the possibility of damage existing in other machines as mentioned above.

The base plate D is tapered at $d^2$ near the head of the machine in order not to impede the current of air for cooling the engine cylinder, such part $d^2$ also serving to catch the dust or mud raised by the front wheel and so prevent it from being thrown on to the rider.

In the modification shown by Fig. 3, the central part of the base plate is extended and curved at $d^3$ to form a mud-guard for the rear wheel $e$; $f$ $f$ being stays to support the outer end of the guard and the plate D may in like manner be extended forwardly as shown at $d^5$ for a similar purpose in connection with the front wheel. The engine G may with advantage be disposed intermediate to the side frames A and can be bolted direct thereto or torque rods $h$ $h'$ as shown in dotted lines may be provided. The preferred contour of the frame is as shown, viz. upswept at $a'$ to accommodate the back axle and allow of a low engine position and curved at $a^2$ to follow the shape of the front wheel, the intermediate portion $a^3$ being straight. If desired the parts $a'$ $a^2$ may follow a straight line instead of a curve. The seat tube $k$ may be jointed to the frame by a bolt $k'$ and T piece $k^2$.

The advance presented by this invention will at once be evident as appurtenances such as foot boards and devices for protecting the rider from mud are for the first time enabled to constitute part of the frame, and thereby very materially adding to the strength and durability of the latter. Furthermore the foot boards with the particular manner in which they are combined with the front mud guard and also continued in a backward direction to the rear of the vehicle, are rendered particularly rigid, and inconveniences hitherto experienced by reason of breakage are thus removed.

According to my invention, a much lower disposition of the frame may be obtained, and the number of reaches greatly reduced, by providing a single pair of angle reaches having relatively high vertical angle portions to resist the stress in one direction, and a single transversely flat and relatively wide base reach, secured to the angle reaches, and adapted to resist stress in another direction. It will be seen that the function of the wide base reach, in projecting laterally of the angle reaches, is not only to stiffen the frame against lateral stress, but to provide outwardly disposed foot-rests and mudguards. It will therefore be seen that the extension of the base reach, laterally of the angle reaches, performs a dual function. By means of this construction I avoid the necessity of superposed pairs of reaches and I obtain a drop frame which is open, entirely above the reaches and which provides for all the rigidity heretofore obtained by superposed pairs of reaches.

It will thus be understood that the present invention provides an open type of frame which while being considerably in advance of previous frames particularly in regard to strength is at the same time constructed with a minimum of joints.

Having now described my invention, I declare that what I claim is:—

1. In a motor cycle, the combination with a rear fork having wheel journal centers and a seat post tube connected with the fork at its upper end, a front fork tube, a longitudinally disposed pair of angle reaches extending from said journal centers to said front tube and secured rigidly to the latter, said reaches being spaced apart from each other and having relatively high vertical angle portions and relatively narrow horizontal angle portions both extending throughout the length of said reaches, said reaches sloping downwardly and rearwardly from said front tube and downwardly and forwardly from said journal centers and having relatively long central horizontal portions, and a transversely flat plate or strip-like base reach shaped to conform to said angle reaches and extending throughout the length thereof and rigidly secured to the narrow horizontal angle flanges thereof and to said front tube, said base reach being relatively narrow at its front end and being widened and projecting laterally from both sides of the angle reaches at their downwardly sloping forward portions to form mud guards, and said base reach being further widened along the central horizontal portions of said angle reaches to form laterally projecting foot rests on opposite sides thereof and to stiffen the frame, the rear end of said base being forked to accommodate the rear wheel, an engine mounted on said base reach between the angle reaches, rods connecting the engine with the front fork tube, rods connecting the engine with the vertical angle portions of said angle reaches near their upper rear ends, and means connecting the seat post tube between the vertical angle portions of said angle reaches at a point forwardly of the forked portions of said base reach, substantially as described.

2. In a motor cycle, the combination with a rear fork having wheel journal centers and a seat post tube connected with the rear fork, a front fork tube, a longitudinally disposed pair of angle reaches extending from said journal centers to said front tube and secured rigidly to the latter, said angle reaches having relatively high vertical angle portions and horizontally disposed flanges extending throughout the length of said angle reaches, and a transversely flat plate or strip-like base reach shaped to conform to the angle reaches and extending throughout the length thereof and rigidly secured to the horizontal flanges of the angle reaches and to said front tube, said base reach being relatively narrow at its front end and projecting laterally from the outer sides of the said angle reaches near the central portions thereof to form relatively wide foot rests and to stiffen the frame against lateral stress, the rear end of the base reach being forked to accommodate the rear wheel, an engine mounted on said base reach between the angle reaches, means secured to the engine and to said angle reaches for anchoring the engine into position, and means for anchoring the lower end of said seat post tube to the vertical angle portions of said angle reaches, substantially as described.

In witness whereof I have hereunto set my hand in the presence of two witnesses.

ARTHUR W. WALL.

Witnesses:
ROWLAND L. GOOLD,
WALTER H. E. BARTLAM.